(12) United States Patent
Kanao et al.

(10) Patent No.: US 9,911,438 B2
(45) Date of Patent: Mar. 6, 2018

(54) MAGNETIC RECORDING AND REPRODUCING DEVICE COMPRISING A MAGNETIC HEAD FIRST REPRODUCING UNIT INCLUDING A MAGNETIC FIELD GENERATOR

(71) Applicant: Kabushiki Kaisha Toshiba, Tokyo (JP)

(72) Inventors: Taro Kanao, Kawasaki Kanagawa (JP); Hirofumi Suto, Kawasaki Kanagawa (JP); Koichi Mizushima, Kamakura Kanagawa (JP); Rie Sato, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/437,920

(22) Filed: Feb. 21, 2017

(65) Prior Publication Data

US 2017/0352367 A1    Dec. 7, 2017

(30) Foreign Application Priority Data

Jun. 6, 2016   (JP) ................ 2016-113003

(51) Int. Cl.
*G11B 5/33* (2006.01)
*G11B 5/31* (2006.01)
*G11B 5/82* (2006.01)

(52) U.S. Cl.
CPC .............. *G11B 5/313* (2013.01); *G11B 5/332* (2013.01); *G11B 5/82* (2013.01)

(58) Field of Classification Search
CPC .................................................. G11B 5/332
(Continued)

(56) References Cited

U.S. PATENT DOCUMENTS 8,462,461 B2 * 6/2013 Braganca ............ G01R 33/093
                                                360/125.3
9,007,720 B2 * 4/2015 Fukuzawa ............ B82Y 10/00
                                                360/125.3
(Continued)

FOREIGN PATENT DOCUMENTS

| JP | 2012-203916 | 10/2012 |
| JP | 2013-200915 | 10/2013 |
| JP | 2014-170604 | 9/2014 |

OTHER PUBLICATIONS

Suto et al., "Nanoscale layer-selective readout of magnetization direction from a magnetic multilayer using a spin-torque oscillator," *Nanotechnology* 25 (2014) 245501, pp. 1-8.

*Primary Examiner* — Jefferson Evans
(74) *Attorney, Agent, or Firm* — Finnegan, Henderson, Farabow, Garrett & Dunner, L.L.P.

(57) ABSTRACT

According to one embodiment, a magnetic recording and reproducing device includes a magnetic recording medium, and a magnetic head including a first reproducing unit. The first reproducing unit includes a first magnetic field generator separated from the magnetic recording medium in a first direction, and a first stacked body. At least a portion of the first stacked body is provided between the magnetic recording medium and the first magnetic field generator in the first direction. The first stacked body includes a first magnetic layer, a second magnetic layer separated from the first magnetic layer in a second direction crossing the first direction, and a first intermediate layer provided between the first magnetic layer and the second magnetic layer. The first stacked body performs an operation of generating a first alternating magnetic field. The first magnetic field generator generates a first magnetic field.

19 Claims, 10 Drawing Sheets

(58) Field of Classification Search
USPC .......................................................... 360/110
See application file for complete search history.

(56) References Cited

U.S. PATENT DOCUMENTS

| | | | |
|---|---|---|---|
| 9,230,571 B1* | 1/2016 | Chen ...................... | G11B 5/314 |
| 9,595,917 B2* | 3/2017 | Kan ...................... | H03B 15/006 |
| 9,607,645 B2* | 3/2017 | Fukuzawa ................ | G11B 5/66 |
| 9,704,552 B2* | 7/2017 | Kudo .................... | G11C 11/161 |
| 2011/0279921 A1* | 11/2011 | Zhang .................... | B82Y 10/00 |
| | | | 360/59 |
| 2012/0075752 A1* | 3/2012 | Sato ...................... | G01R 33/098 |
| | | | 360/324 |
| 2012/0243127 A1 | 9/2012 | Iwasaki et al. | |
| 2012/0250180 A1* | 10/2012 | Mizushima .............. | G11B 5/39 |
| | | | 360/75 |
| 2013/0070361 A1* | 3/2013 | Yang ...................... | G11B 5/66 |
| | | | 360/55 |
| 2014/0104724 A1* | 4/2014 | Shiroishi ................. | G11B 5/66 |
| | | | 360/75 |
| 2014/0168812 A1* | 6/2014 | Braganca ............... | G01R 33/00 |
| | | | 360/75 |
| 2014/0247520 A1 | 9/2014 | Yang et al. | |
| 2016/0035375 A1* | 2/2016 | Gao ........................ | G11B 5/35 |
| | | | 360/125.3 |

\* cited by examiner

US 9,911,438 B2

MAGNETIC RECORDING AND REPRODUCING DEVICE COMPRISING A MAGNETIC HEAD FIRST REPRODUCING UNIT INCLUDING A MAGNETIC FIELD GENERATOR

CROSS-REFERENCE TO RELATED APPLICATIONS

This application is based upon and claims the benefit of priority from Japanese Patent Application No. 2016-113003, filed on Jun. 6, 2016; the entire contents of which are incorporated herein by reference.

FIELD

Embodiments described herein relate generally to a magnetic recording and reproducing device, a magnetic head, and a magnetic recording medium.

BACKGROUND

In a magnetic recording and reproducing device, it is desirable to perform stable reproduction and to increase the recording density.

DETAILED DESCRIPTION

Figure 1:
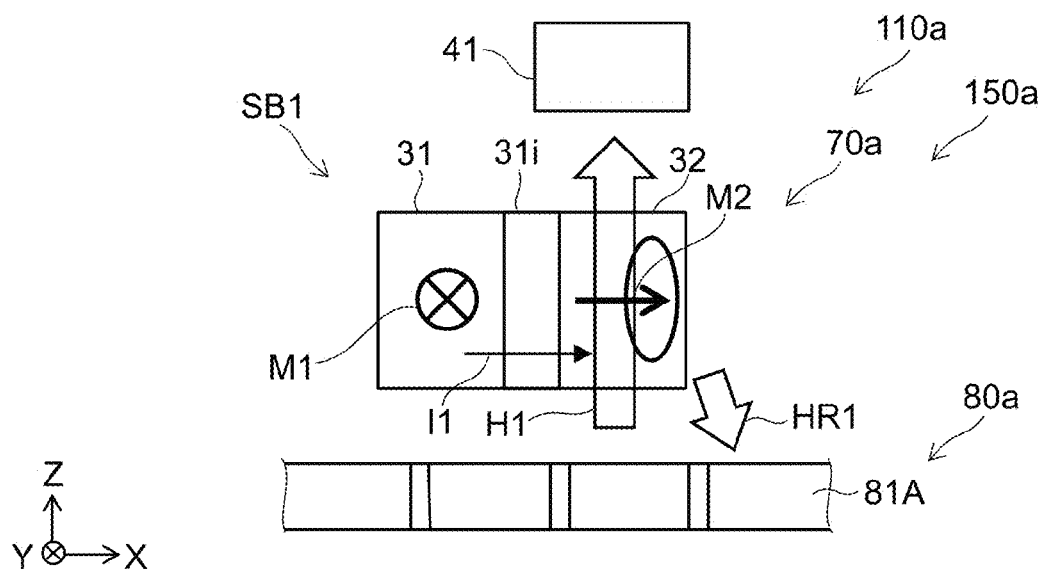
FIG. 1 is a schematic cross-sectional view illustrating a magnetic recording and reproducing device according to a first embodiment.

According to one embodiment, a magnetic recording and reproducing device includes a magnetic recording medium, and a magnetic head including a first reproducing unit. The first reproducing unit includes a first magnetic field generator separated from the magnetic recording medium in a first direction, and a first stacked body. At least a portion of the first stacked body is provided between the magnetic recording medium and the first magnetic field generator in the first direction. The first stacked body includes a first magnetic layer, a second magnetic layer separated from the first magnetic layer in a second direction crossing the first direction, and a first intermediate layer provided between the first magnetic layer and the second magnetic layer. The first stacked body is configured to perform an operation of generating a first alternating magnetic field. The first magnetic field generator is configured to generate a first magnetic field.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1 is a schematic cross-sectional view illustrating a magnetic recording and reproducing device according to a first embodiment.

As shown in FIG. 1, the magnetic recording and reproducing device 150a according to the embodiment includes a magnetic recording medium 80a and a magnetic head 110a. The magnetic head 110a includes a first reproducing unit 70a.

The first reproducing unit 70a includes a first magnetic field generator 41 and a first stacked body SB1. The first magnetic field generator 41 is separated from the magnetic recording medium 80a in a first direction.

The first direction is taken as a Z-axis direction. One direction perpendicular to the Z-axis direction is taken as an X-axis direction. A direction perpendicular to the Z-axis direction and the X-axis direction is taken as a Y-axis direction.

For example, the magnetic recording medium 80a spreads along the X-Y plane. In the example, the magnetic recording medium 80a includes a first recording layer 81A. As described below, multiple recording layers may be provided. The recording layers are, for example, perpendicular magnetization films.

At least a portion of the first stacked body SB1 is provided between the magnetic recording medium 80a and the first magnetic field generator 41 in the first direction (the Z-axis direction).

The first stacked body SB1 includes a first magnetic layer 31, a second magnetic layer 32, and a first intermediate layer 31*i*. The second magnetic layer 32 is separated from the first magnetic layer 31 in a second direction. The second direction crosses the first direction (the Z-axis direction). The second direction is, for example, the X-axis direction. The second direction may be tilted with respect to the first direction. The first intermediate layer 31*i* is provided between the first magnetic layer 31 and the second magnetic layer 32. The first intermediate layer 31*i* is nonmagnetic.

The first stacked body SB1 performs an operation of generating a first alternating magnetic field HR1. The first stacked body SB1 is, for example, a spin torque oscillator. The first alternating magnetic field HR1 is, for example, a high frequency magnetic field. The frequency of the first alternating magnetic field HR1 is, for example, not less than 1 GHz and not more than 10 GHz.

For example, the first magnetic layer 31 is a fixed magnetic layer. The second magnetic layer 32 is a generation layer.

The first magnetic field generator 41 generates a first magnetic field H1. The first magnetic field H1 is applied to at least a portion of the first stacked body SB1. For example, the first magnetic field H1 has a component along a direction connecting the magnetic recording medium 80*a* and the first magnetic field generator 41. For example, the first magnetic field H1 has a component oriented from the magnetic recording medium 80*a* toward the first magnetic field generator 41.

For example, in the magnetic recording and reproducing device 150*a* according to the embodiment, the first alternating magnetic field HR1 is applied to the recording layer when reproducing. The frequency of the first alternating magnetic field HR1 is set to be substantially the same as the magnetic resonance frequency of the recording layer (e.g., the first recording layer 81A). Magnetic resonance is generated in the recording layer. As described below, the magnetic resonance frequency of the recording layer changes according to the state of the magnetization of the recording layer (the state of the recorded information). When the magnetic resonance is generated in the recording layer, the oscillation characteristics of the first stacked body SB1 change. The state of the magnetization of the recording layer can be known by sensing the characteristics of the first stacked body SB1. Thereby, the information that is recorded can be reproduced. By such a reproducing method, for example, it is possible to reproduce from a recording medium designed to suppress the effects of the stray magnetic fields between the recording layers inside the recording medium; and the recording density can be increased.

For example, there are cases where the frequency (the oscillation frequency) of the first alternating magnetic field HR1 generated from the first stacked body SB1 changes due to the stray magnetic field from the magnetic recording medium 80*a*. In such a case, the conditions of the resonance are no longer satisfied; and stable reproduction becomes difficult.

For example, it is favorable for the oscillation axis (the rotation axis of the oscillation) to be aligned with the X-axis direction. Thereby, the oscillation frequency is not easily affected by the stray magnetic field; and the reproduction is stable. On the other hand, as described below, there are cases where the oscillation axis of the generation layer (the second magnetic layer 32) is tilted from the desired state due to spin torque. For example, the oscillation axis is tilted from the X-axis direction. For example, the oscillation axis is tilted, for example, in the downward direction toward the magnetic recording medium 80*a*. In such a case, the reproduction easily becomes unstable.

In the embodiment, the first magnetic field H1 is applied to the first stacked body SB1 by the first magnetic field generator 41. For example, the effects of the stray magnetic field on the oscillation frequency can be suppressed by the first magnetic field H1. For example, the oscillation axis can be stably aligned with the X-axis direction. For example, the tilt in the downward direction of the oscillation axis can be suppressed by the first magnetic field H1.

In the embodiment, for example, the effects of the stray magnetic field on the first stacked body SB1 can be suppressed. Thereby, reproduction that utilizes resonance can be implemented stably.

For example, a stable reproduction operation is possible even in the case where the recording density is increased. According to the embodiment, a magnetic recording and reproducing device can be provided in which the recording density can be increased.

In the embodiment as recited above, the frequency of the first alternating magnetic field HR1 generated from the first stacked body SB1 is matched to the resonance frequency of the recording layer to be reproduced.

In the embodiment, the frequency of the first alternating magnetic field HR1 can be controlled by a first current I1 flowing through the first stacked body SB1. For example, the frequency of the first alternating magnetic field HR1 changes according to the current (the first current I1) flowing between the first magnetic layer 31 and the second magnetic layer 32. By controlling the first current I1, for example, the frequency of the first alternating magnetic field HR1 can substantially match the magnetic resonance frequency of the recording layer.

The first magnetic field generator 41 may include at least one of a magnetic body or an electromagnet. In the case where the first magnetic field generator 41 includes an electromagnet, the first magnetic field H1 is changed by modifying the current flowing in the electromagnet. The control of the first magnetic field H1 is easy.

In the case where the first magnetic field generator 41 includes a magnetic body (e.g., a permanent magnet, etc.), for example, the frequency of the first alternating magnetic field HR1 may be controlled by the first current I1.

In the embodiment, for example, a first magnetization M1 of the first magnetic layer 31 crosses the first direction (the Z-axis direction). The first magnetization M1 crosses the second direction recited above. For example, the first magnetization M1 is substantially perpendicular to the first direction. The first magnetization M1 may be substantially perpendicular to the second direction (the stacking direction).

The first stacked body SB1 has a state in which the first stacked body SB1 does not oscillate. For example, an oscillation is not generated when the first current I1 flowing in the first stacked body SB1 is less than a threshold. The first alternating magnetic field HR1 is not generated in the state of no oscillation. In such a state in which the first alternating magnetic field HR1 is not generated, a second magnetization M2 of the second magnetic layer 32 is aligned with the second direction (the stacking direction). For example, the second magnetization M2 of the second magnetic layer 32 is aligned with the second direction when a current does not flow in the first stacked body SB1. For example, the second magnetization M2 is aligned with the X-axis direction. For example, the second magnetization M2 has a component along a direction connecting the first magnetic layer 31 and the second magnetic layer 32. For example, the second magnetization M2 has a component along a direction from one of the first magnetic layer 31 and the second magnetic layer 32 toward other one of the first magnetic layer 31 and the second magnetic layer 32. For example, the second magnetization M2 has a component oriented from the first magnetic layer 31 toward the second magnetic layer 32.

On the other hand, in the oscillating state, for example, the second magnetization M2 of the second magnetic layer 32 rotates with the oscillation axis as a center.

Figure 2:
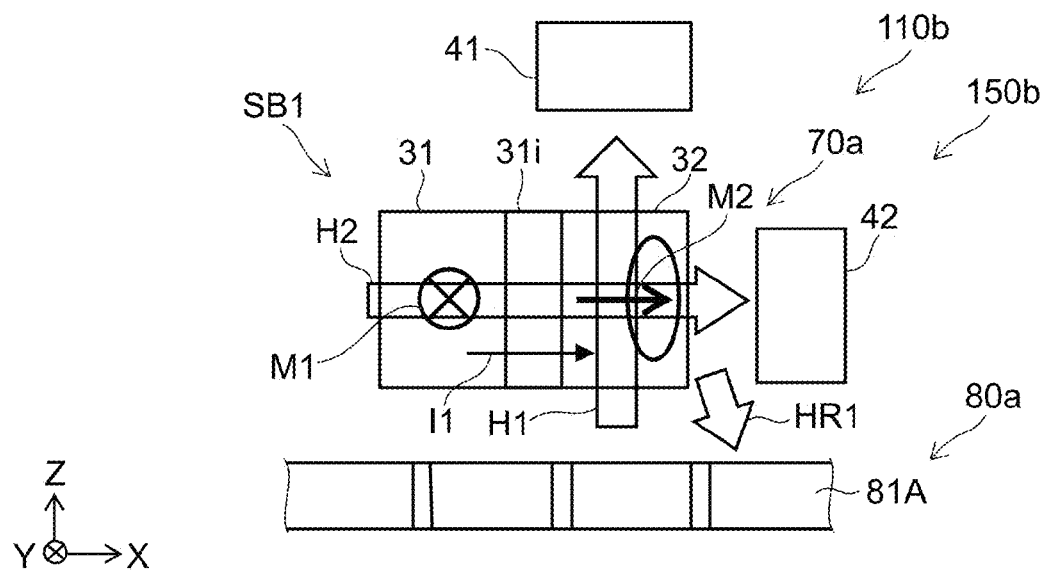
FIG. 2 is a schematic cross-sectional view illustrating another magnetic recording and reproducing device according to the first embodiment.

FIG. 2 is a schematic cross-sectional view illustrating another magnetic recording and reproducing device according to the first embodiment. As shown in FIG. 2, the other magnetic recording and reproducing device 150b according to the embodiment includes the magnetic recording medium 80a and a magnetic head 110b. The magnetic head 110b includes the first reproducing unit 70a. The first reproducing unit 70a further includes a second magnetic field generator 42 in addition to the first magnetic field generator 41 and the first stacked body SB1. The second magnetic layer 32 is disposed between the first magnetic layer 31 and the second magnetic field generator 42. The second magnetic field generator 42 generates a second magnetic field H2. The second magnetic field H2 has a component along the direction connecting the first magnetic layer 31 and the second magnetic layer 32. The second magnetic field H2 has a component in an orientation from the first magnetic layer 31 toward the second magnetic layer 32.

The second magnetic field H2 is applied to the stacked body SB1. The effects of the stray magnetic field on the first stacked body SB1 are suppressed further by the second magnetic field H2. Thereby, reproduction that utilizes resonance can be implemented more stably.

For example, the frequency of the first alternating magnetic field HR1 can be controlled by the second magnetic field H2 generated from the second magnetic field generator 42. For example, the frequency of the first alternating magnetic field HR1 changes according to the second magnetic field H2. By controlling the second magnetic field H2, the frequency of the first alternating magnetic field HR1 can substantially match the magnetic resonance frequency of the recording layer.

The second magnetic field generator 42 may include at least one of a magnetic body or an electromagnet.

Figure 3:
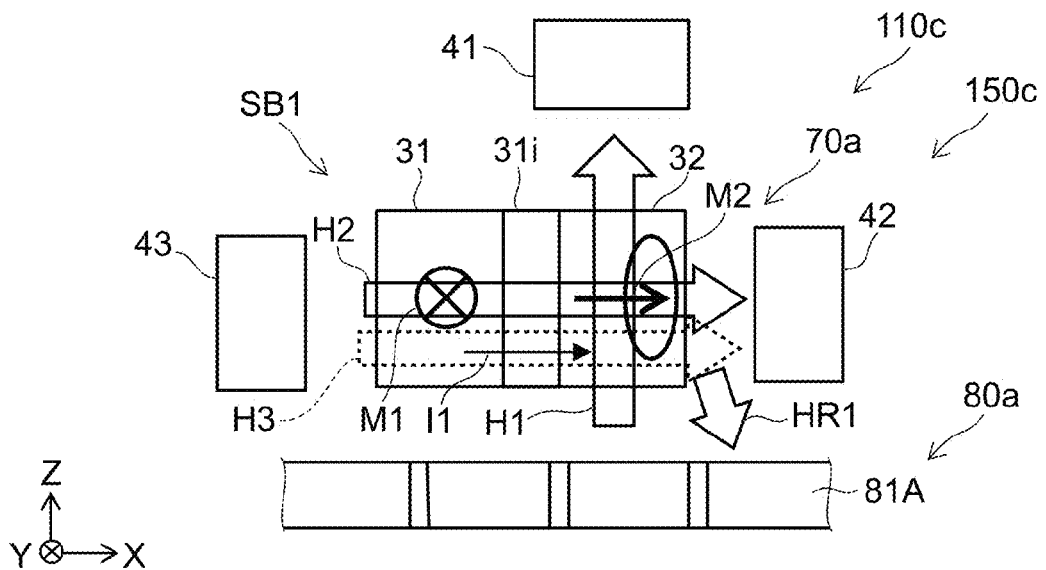
FIG. 3 is a schematic cross-sectional view illustrating another magnetic recording and reproducing device according to the first embodiment.

FIG. 3 is a schematic cross-sectional view illustrating another magnetic recording and reproducing device according to the first embodiment. As shown in FIG. 3, the other magnetic recording and reproducing device 150c according to the embodiment includes the magnetic recording medium 80a and a magnetic head 110c. The magnetic head 110c includes the first reproducing unit 70a. The first reproducing unit 70a further includes a third magnetic field generator 43 in addition to the first magnetic field generator 41 and the first stacked body SB1. In the example, the second magnetic field generator 42 described in reference to the magnetic recording and reproducing device 150b also is provided.

The first magnetic layer 31 is disposed between the third magnetic field generator 43 and the second magnetic layer 32. The third magnetic field generator 43 generates a third magnetic field H3. The third magnetic field H3 has a component along the direction connecting the first magnetic layer 31 and the second magnetic layer 32. The third magnetic field H3 has a component in an orientation from the first magnetic layer 31 toward the second magnetic layer 32.

The third magnetic field H3 is applied to the first stacked body SB1. The effects of the stray magnetic field on the first stacked body SB1 can be suppressed further by the third magnetic field H3. Thereby, reproduction that utilizes resonance can be implemented more stably.

For example, the frequency of the first alternating magnetic field HR1 can be controlled by the third magnetic field H3 generated from the third magnetic field generator 43. For example, the frequency of the first alternating magnetic field HR1 changes according to the third magnetic field H3. By controlling the third magnetic field H3, the frequency of the first alternating magnetic field HR1 can substantially match the magnetic resonance frequency of the recording layer.

The third magnetic field generator 43 may include at least one of a magnetic body or an electromagnet.

Figure 4:
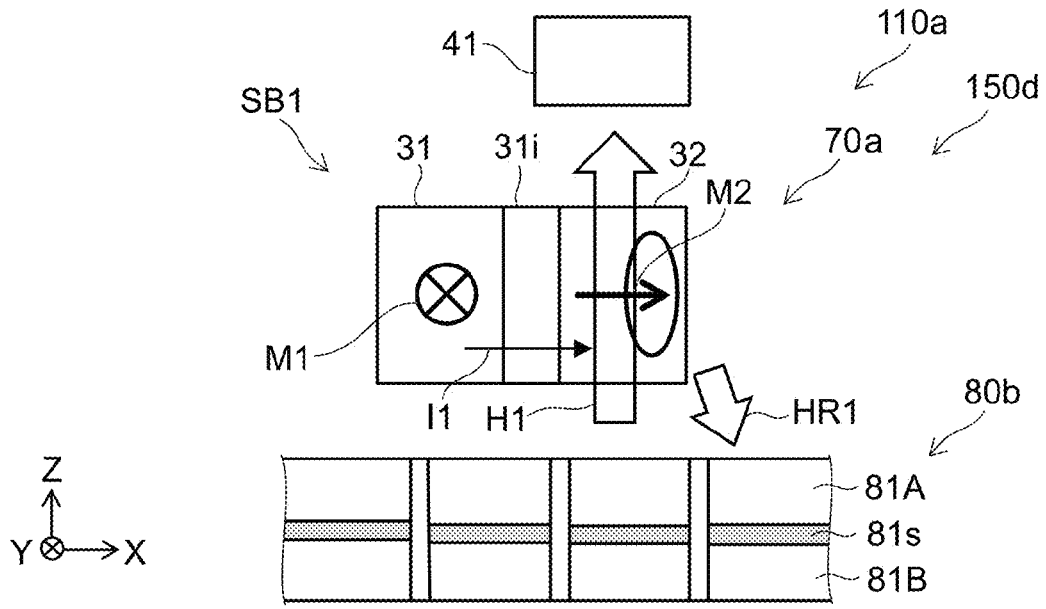
FIG. 4 is a schematic cross-sectional view illustrating another magnetic recording and reproducing device according to the first embodiment.
Figure 5:
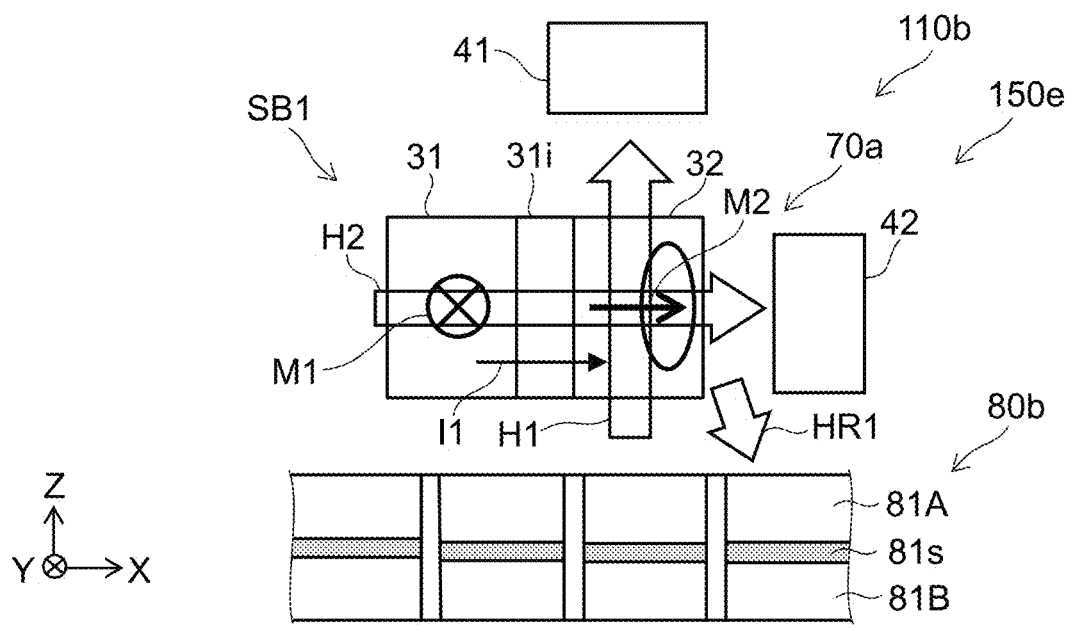
FIG. 5 is a schematic cross-sectional view illustrating another magnetic recording and reproducing device according to the first embodiment.
Figure 6:
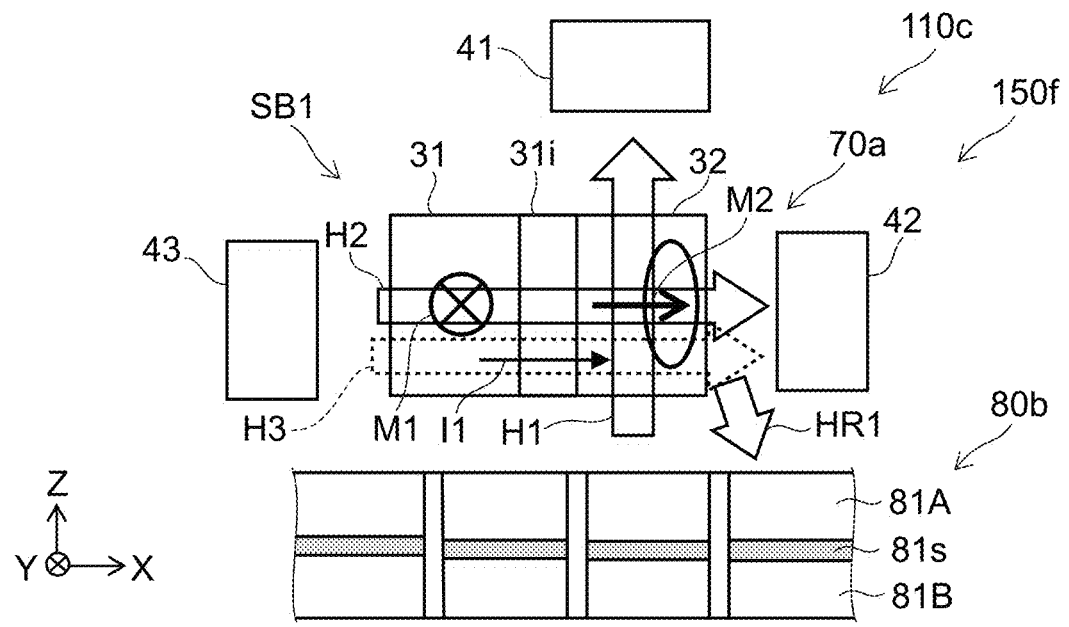
FIG. 6 is a schematic cross-sectional view illustrating another magnetic recording and reproducing device according to the first embodiment.

FIG. 4 to FIG. 6 are schematic cross-sectional views illustrating other magnetic recording and reproducing devices according to the first embodiment.

As shown in FIG. 4, a magnetic recording and reproducing device 150d includes a magnetic recording medium 80b and the magnetic head 110a. The magnetic head 110a is similar to that described in reference to FIG. 1.

The magnetic recording medium 80b further includes a second recording layer 81B in addition to the first recording layer 81A. In the example, an isolation layer 81s is provided. The second recording layer 81B overlaps the first recording layer 81A in the first direction (the Z-axis direction). The isolation layer 81s is provided between the first recording layer 81A and the second recording layer 81B.

The magnetic resonance frequencies of these recording layers are different from each other. For example, the first magnetic resonance frequency of the first recording layer 81A is higher than the second magnetic resonance frequency of the second recording layer 81B. In the example, at least a portion of the first recording layer 81A is positioned between the second recording layer 81B and the first stacked body SB1.

In the reproduction operation, the first stacked body SB1 generates a high frequency magnetic field (the first alternating magnetic field HR1) corresponding to each of the multiple recording layers. For example, the first reproducing unit 70a implements a first operation and a second operation. In the first operation, the first reproducing unit 70a reproduces the information recorded in the first recording layer 81A. In the second operation, the first reproducing unit 70a reproduces the information recorded in the second recording layer 81B. For example, the first frequency of the first alternating magnetic field HR1 in the first operation is higher than the second frequency of the first alternating magnetic field HR1 in the second operation.

For example, the first frequency of the first alternating magnetic field HR1 in the first operation substantially matches the first magnetic resonance frequency of the first recording layer 81A. The second frequency of the first alternating magnetic field HR1 in the second operation substantially matches the second magnetic resonance frequency of the second recording layer 81B.

By using the multiple recording layers, the substantial recording density of the magnetic recording medium can be high.

As shown in FIG. 5, a magnetic recording and reproducing device 150e includes the magnetic recording medium 80b and the magnetic head 110b. The magnetic head 110b is similar to that described in reference to FIG. 2. The magnetic recording medium 80b is similar to that described in reference to FIG. 4.

As shown in FIG. 6, a magnetic recording and reproducing device 150f includes the magnetic recording medium 80b and the magnetic head 110c. The magnetic head 110c is similar to that described in reference to FIG. 3. The magnetic recording medium 80b is similar to that described in reference to FIG. 4.

In the magnetic recording and reproducing devices 150e and 150f as well, by using the multiple recording layers, the substantial recording density of the magnetic recording medium can be high. In the magnetic recording and reproducing devices 150d to 150f as well, the effects of the stray magnetic field from the magnetic recording medium on the first stacked body SB1 can be suppressed. Thereby, reproduction that utilizes resonance can be implemented stably. A magnetic recording and reproducing device can be provided in which the recording density can be increased.

The first recording layer 81A and the second recording layer 81B include magnetic bodies. In each of these recording layers, for example, the information of 1 bit is recorded by changing the direction of the magnetization. For example, the isolation layer 81s magnetically isolates these recording layers from each other. For example, the isolation layer 81s does not cause magnetic exchange coupling to act between the multiple recording layers. The isolation layer 81s includes, for example, at least one of Ta or Ti. The isolation layer 81s may include an insulating material (e.g., $SiO_2$, etc.).

In the embodiment, the number of multiple recording layers may be three or more. The multiple recording layers are stacked in the Z-axis direction.

In the embodiment, the position of the recording region provided in the first recording layer 81A may be different from the position of the recording region provided in the second recording layer 81B. For example, the size of the recording region provided in the first recording layer 81A may be different from the size of the recording region provided in the second recording layer 81B. For example, the size of the recording region provided in the first recording layer 81A may be smaller than the size of the recording region provided in the second recording layer 81B. Thereby, for example, the recording density can be increased.

In the magnetic recording media 80a and 80b, the recording layer may include at least one of a bit-patterned medium, a continuous medium, or a granular medium. The recorded bits are separated in the bit-patterned medium.

Figure 7:
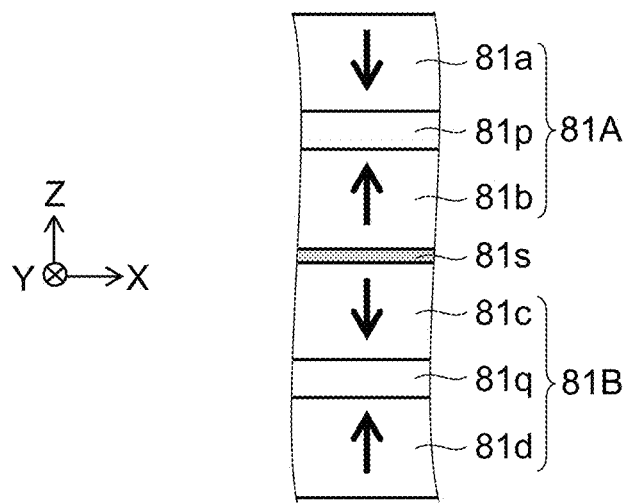
FIG. 7 is a schematic cross-sectional view illustrating a portion of the magnetic recording and reproducing device according to the first embodiment.

FIG. 7 is a schematic cross-sectional view illustrating a portion of the magnetic recording and reproducing device according to the first embodiment.

FIG. 7 shows an example of the recording layers (the first recording layer 81A and the second recording layer 81B) of the magnetic recording medium 80a or 80b.

In the example as shown in FIG. 7, the first recording layer 81A includes a first magnetic film 81a and a second magnetic film 81b. The second magnetic film 81b overlaps the first magnetic film 81a in the first direction (the Z-axis direction). In the example, a first nonmagnetic film 81p is provided between the first magnetic film 81a and the second magnetic film 81b.

For example, the orientation of the magnetization of the second magnetic film 81b has a component opposite to the orientation of the magnetization of the first magnetic film 81a. For example, antiferromagnetic exchange coupling acts between the first magnetic film 81a and the second magnetic film 81b.

The first magnetic film 81a and the second magnetic film 81b have perpendicular magnetic anisotropy. The magnetizations of these magnetic films are coupled to be antiparallel to each other.

For example, the first magnetic film 81a is a magnetic layer used in the reproduction. The magnetic resonance frequency of the first magnetic film 81a is, for example, not less than 1 GHz and not more than 20 GHz. The first magnetic film 81a includes, for example, at least one of a Co or CoCr-based alloy. The first magnetic film 81a may include, for example, at least one of a multilayer film including a Co film and a Pt film, or a multilayer film including a Co film and a Pd film.

The magnetic recording medium becomes thick if the first recording layer 81A is thick. In such a case, a region occurs in the second recording layer 81B where the first alternating magnetic field HR1 generated from the first stacked body SB1 weakens. It is favorable for the first magnetic film 81a to be thin.

For example, the second magnetic film 81b maintains the recording stability of the information. The second magnetic film 81b includes, for example, a material having a large magnetic anisotropy. The second magnetic film 81b includes, for example, at least one of a CoCr-based alloy, an FePt-based alloy, a CoPt-based alloy, or a RE-TM alloy. The second magnetic film 81b may include, for example, at least one of a multilayer film including a Co film and a Pt film, or a multilayer film including a Co film and a Pd film. Thereby, the information that is recorded can be retained effectively. The range that is reached by the first alternating magnetic field HR1 generated by the first stacked body SB1 is limited. Therefore, it is favorable for the second magnetic film 81b also to be thin in a range where the thermal stability does not degrade.

The first nonmagnetic film 81p includes, for example, Ru. For example, the first nonmagnetic film 81p causes antiferromagnetic exchange coupling to act between the first magnetic film 81a and the second magnetic film 81b. For example, the stray magnetic field from the magnetization of the first magnetic film 81a and the stray magnetic field from the magnetization of the second magnetic film 81b act to cancel each other. Therefore, the interference between the bits caused by the stray magnetic field can be suppressed. The effects on the magnetic head from the magnetic recording medium can be suppressed. For example, the stray magnetic field is small when the magnetic moment of the first magnetic film 81a is the same as the magnetic moment of the second magnetic film 81b. The magnetic moment is the product of the magnitude of the magnetization of the magnetic body and the volume of the magnetic body.

For example, the coercivity of the first magnetic film 81a is smaller than the coupling magnetic field between the first magnetic film 81a and the second magnetic film 81b. Thereby, the state of the antiparallel coupling is maintained easily. The coupling magnetic field is, for example, a magnetic field corresponding to the strength of the antiparallel coupling. Because the range that is reached by the first alternating magnetic field HR1 from the first stacked body SB1 is limited, it is favorable for the first nonmagnetic film 81p also to be thin.

As shown in FIG. 7, for example, the second recording layer 81B includes a third magnetic film 81c and a fourth magnetic film 81d. The fourth magnetic film 81d overlaps the third magnetic film 81c in the first direction (the Z-axis direction). In the example, the second magnetic film 81b is provided between the first magnetic film 81a and the fourth magnetic film 81d. The third magnetic film 81c is provided between the second magnetic film 81b and the fourth magnetic film 81d. The isolation layer 81s is provided between the second magnetic film 81b and the third magnetic film 81c. In the example, a second nonmagnetic film 81q is provided between the third magnetic film 81c and the fourth magnetic film 81d.

For example, the orientation of the magnetization of the fourth magnetic film 81d has a component opposite to the orientation of the magnetization of the third magnetic film 81c. For example, antiferromagnetic exchange coupling acts between the third magnetic film 81c and the fourth magnetic film 81d. The third magnetic film 81c and the fourth magnetic film 81d have perpendicular magnetic anisotropy.

The description relating to the first magnetic film 81a recited above is applicable to the third magnetic film 81c. The description relating to the second magnetic film 81b recited above is applicable to the fourth magnetic film 81d.

Examples of magnetic field generators (e.g., the first to third magnetic field generators 41 to 43, etc.) will now be described. The magnetic field generator includes, for example, a magnetic body (e.g., a permanent magnet, etc.). The magnetic field generator may include a magnetic pole. For example, the magnetic pole guides the magnetic field generated by the current in the coil to the magnetic field generator. The magnetic fields (the first to third magnetic fields H1 to H3) are generated from the magnetic field generators.

The second magnetic field H2 (and the third magnetic field H3) have components perpendicular to the layer surface of the second magnetic layer 32 of the first stacked body SB1. For example, the magnetic fields are aligned with the second direction.

In the case where the magnetic field generator includes a magnetic pole and generates a magnetic field, the magnitude of the generated magnetic field can be changed by changing the magnitude of the magnetization of the magnetic pole by the current in the coil. In such a case, the oscillation frequency of the first stacked body SB1 (the frequency of the first alternating magnetic field HR1) can be changed.

The magnetic field generator applies a magnetic field to the first stacked body SB1. The magnetic field may be applied to the magnetic recording medium 80a or 80b. For example, the first magnetic field H1 that is generated from the first magnetic field generator 41 is applied to the magnetic recording medium 80a or 80b. The first magnetic field H1 is a reproducing magnetic field. The first magnetic field H1 is aligned with the Z-axis direction. The first magnetic field H1 is substantially perpendicular to the magnetic recording media 80a and 80b (referring to FIG. 1 to FIG. 6).

The stacking direction (the second direction) of the first stacked body SB1 is aligned with the magnetic recording medium 80a or 80b. The first magnetic layer 31 includes a magnetic body. The first magnetization M1 of the first magnetic layer 31 is aligned with the in-plane direction of the first magnetic layer 31.

The second magnetic layer 32 oscillates. The oscillation is based on spin torque corresponding to the first current I1 between the first magnetic layer 31 and the second magnetic layer 32. The oscillation axis is aligned with the surface normal direction of the second magnetic layer 32.

For example, the first current I1 that flows through the first stacked body SB1 is substantially parallel to the magnetic recording medium 80a or 80b. The second magnetic layer 32 can approach the magnetic recording medium 80a or 80b.

In this configuration of the first stacked body SB1, the change of the angle between the first magnetization M1 of the first magnetic layer 31 and the second magnetization M2 of the second magnetic layer 32 is large for one period of the precession. Therefore, the output signal based on the magnetoresistance effect is large.

In the first stacked body SB1, the first magnetization M1 is aligned with the in-plane direction of the first magnetic layer 31 and substantially parallel to the magnetic recording medium 80a or 80b. On the other hand, the second magnetization M2 is aligned with the surface normal direction of the second magnetic layer 32. Thereby, the spin torque that is applied to the second magnetic layer 32 is unresponsive to the Z-axis direction component of the second magnetization M2 (the component in the direction perpendicular to the magnetic recording medium 80a or 80b). Thereby, the oscillation of the first stacked body SB1 is unresponsive to the stray magnetic field from the magnetic recording medium 80a or 80b (the magnetic field in the Z-axis direction).

The first intermediate layer 31i includes, for example, MgO. In such a case, the first stacked body SB1 corresponds to a tunneling magnetoresistance effect element. In such a case, the magnetoresistance effect is large. Therefore, a large output signal is obtained.

In the case where the first magnetic layer 31 includes CoFeB, a large magnetoresistance effect is obtained. For example, the first magnetic layer 31 may have a stacked structure. In the stacked structure, for example, an IrMn-layer, a Ru layer, and a CoFe layer are stacked. Thereby, for example, the first magnetization M1 of the first magnetic layer 31 is fixed.

For example, the second magnetic layer 32 has perpendicular magnetic anisotropy. The second magnetic layer 32 may include, for example, a combination including an FeB layer and a MgO layer.

In the case where the second magnetic field generator 42 is provided, for example, the distance between the second magnetic field generator 42 and the second magnetic layer 32 can be shortened. For example, the second magnetic field H2 that is generated from the second magnetic field generator 42 can be applied efficiently to the second magnetic layer 32.

In the case where the third magnetic field generator 43 is provided in addition to the second magnetic field generator 42, for example, the magnetic field (the synthesized magnetic field of the second magnetic field H2 and the third magnetic field H3) that is applied to the first stacked body SB1 easily becomes uniform. For example, the flux that is emitted from the third magnetic field generator 43 enters the second magnetic field generator 42. Thereby, the magnetic effects on the magnetic recording media 80a and 80b can be suppressed.

Examples of the states of the magnetic field of the magnetic recording and reproducing device according to the embodiment will now be described. An example will now be described in which the magnetic recording medium 80b that includes multiple recording layers is used as the magnetic recording medium.

Figure 8:
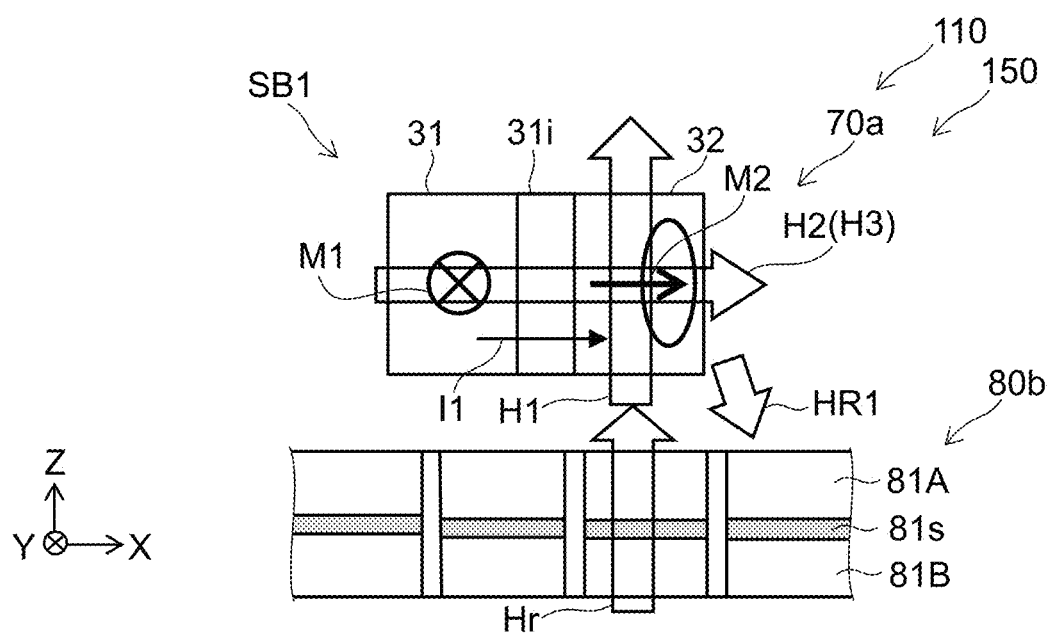
FIG. 8 is a schematic cross-sectional view illustrating the magnetic recording and reproducing device according to the first embodiment.

FIG. 8 is a schematic cross-sectional view illustrating the magnetic recording and reproducing device according to the first embodiment.

The magnetic field generators are not illustrated in FIG. 8.

As shown in FIG. 8, a magnetic head 110 and the magnetic recording medium 80b are provided in a magnetic recording and reproducing device 150 according to the embodiment.

The first magnetic field H1 is generated from the first magnetic field generator 41. The first magnetic field H1 is applied to the stacked body SB1. The first magnetic field H1 may be further applied to the magnetic recording medium 80b. The first magnetic field H1 may function as a reproducing magnetic field Hr. The reproducing magnetic field Hr may be generated by providing a magnetic field generator other than the first magnetic field generator 41. An example will now be described in which the first magnetic field H1 is used as the reproducing magnetic field Hr.

On the other hand, as shown in FIG. 8, the second magnetic field H2 is applied to the first stacked body SB1. The second magnetic field H2 may be the third magnetic field H3. The description relating to the second magnetic field H2 hereinbelow is applicable to the third magnetic field H3.

The second magnetic field H2 is aligned with the stacking direction (the second direction) of the first stacked body SB1. The frequency of the oscillation of the second magnetization M2 of the second magnetic layer 32 changes due to the magnitude of the second magnetic field H2.

For example, a configuration is assumed in which the first recording layer 81A includes multiple magnetic films (the first magnetic film 81a, the second magnetic film 81b, etc.), and these magnetic films have antiparallel coupling. The magnitudes of the magnetizations of these magnetic films are taken to be substantially the same. In such a case, the resonance frequency is independent of the orientations of the magnetizations of the magnetic films when the external magnetic field is not applied to the magnetic recording medium 80b.

On the other hand, when the reproducing magnetic field Hr (e.g., the first magnetic field H1, etc.) in the direction perpendicular to the magnetic recording medium 80b is applied to the magnetic recording medium 80b, the magnetic resonance frequencies of the magnetic films become dependent on the orientations of the magnetizations of the magnetic films according to the reproducing magnetic field Hr. For example, when the external magnetic field is applied to the first magnetic film 81a of the first recording layer 81A, the magnetic resonance frequency of the first magnetic film 81a changes according to the state of the magnetization of the first magnetic film 81a. For example, the magnetization of the first magnetic film 81a has multiple states according to the information recorded in the first magnetic film 81a. The magnetic resonance frequency is different between the multiple states.

The orientation of the magnetization of the recording layer can be reproduced utilizing this phenomenon. For example, by narrowing the spatial area where the reproducing magnetic field Hr is applied, the spatial resolution when reproducing can be increased.

There are cases where the stray magnetic field from these magnetic films is not 0 at the vicinity of the magnetic recording medium 80b even in the case where the first magnetic film 81a and the second magnetic film 81b have antiparallel coupling and the magnitudes of the magnetizations of these magnetic films are substantially the same. In the case where the oscillation axis of the second magnetization M2 of the second magnetic layer 32 is tilted with respect to the magnetic recording medium 80b due to the effect of the spin torque, the oscillation frequency may be affected by the stray magnetic field. Thereby, there are cases where stable reproduction becomes difficult.

At this time, by applying the first magnetic field H1 to the first stacked body SB1, for example, the state in which the oscillation axis of the second magnetization M2 is substantially aligned with the magnetic recording medium 80b is maintained easily. In other words, the effects of the stray magnetic field from the magnetic recording medium 80b on the first stacked body SB1 can be suppressed.

The orientation of the oscillation axis of the second magnetization M2 of the second magnetic layer 32 is determined by the effective magnetic anisotropy of the second magnetic layer 32, the external magnetic field applied to the second magnetic layer 32, and the spin torque.

For example, the oscillation axis can be substantially aligned with the magnetic recording medium 80b by adjusting the perpendicular magnetic anisotropy of the second magnetic layer 32, the second magnetic field H2 (or the third magnetic field H3) applied to the first stacked body SB1, the first magnetic field H1, and the first current I1.

The oscillation frequency of the first stacked body SB1 can be controlled by at least one of the second magnetic field H2 (or the third magnetic field H3) or the first current I1. In other words, there are cases where the second magnetic field H2 (or the third magnetic field H3) and the first current I1 are limited to a state appropriate for controlling the oscillation frequency of the first stacked body SB1. In such a case, in the embodiment, for example, the oscillation axis of the first stacked body SB1 can be controlled efficiently and independently of the control of the oscillation frequency of the first stacked body SB1 by providing the first magnetic field generator 41 and applying the first magnetic field H1 to the first stacked body SB1.

For example, the first magnetization M1 of the first magnetic layer 31 is substantially aligned with the magnetic recording medium 80b. In such a case, for example, a force acts due to the spin torque to tilt the oscillation axis of the second magnetization M2 of the second magnetic layer 32 toward the Z-axis direction. For example, the first magnetic field H1 (e.g., the reproducing magnetic field Hr) is adjusted to balance the force. Thereby, the oscillation axis of the second magnetization M2 of the second magnetic layer 32 can be oriented substantially parallel to the magnetic recording medium 80b.

One example of the reproduction operation will now be described.

Figure 9A:
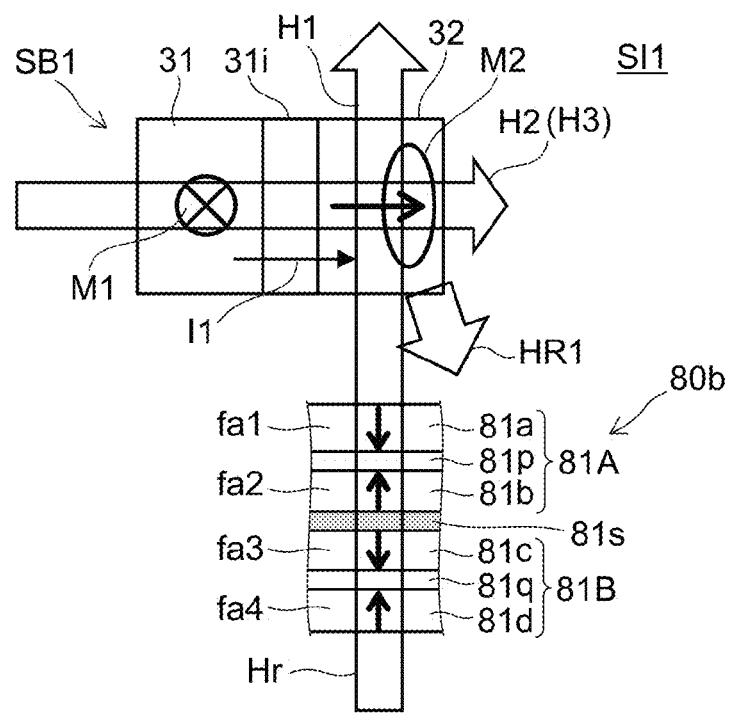
FIG. 9A and FIG. 9B are schematic views illustrating the operations of the magnetic recording and reproducing device according to the first embodiment.
Figure 9B:
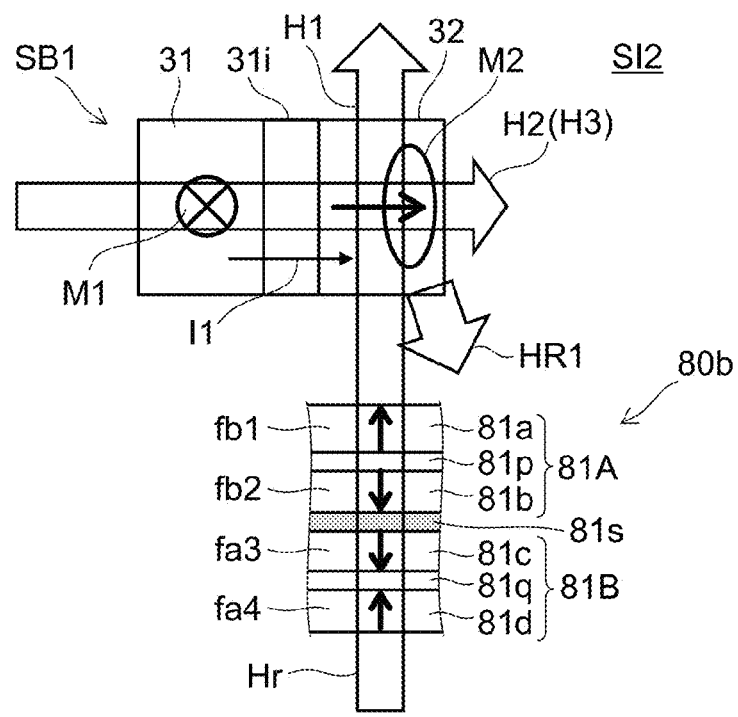

FIG. 9A and FIG. 9B are schematic views illustrating the operations of the magnetic recording and reproducing device according to the first embodiment.

In these drawings, the information that is recorded in the first recording layer 81A is mutually-different. FIG. 9A corresponds to a first recorded state SI1. FIG. 9B corresponds to a second recorded state SI2. In the first recorded state SI1, for example, the magnetization of the first magnetic film 81a of the first recording layer 81A is "down." In the second recorded state SI2, for example, the magnetization of the first magnetic film 81a of the first recording layer 81A is "up." The orientations of these magnetizations are examples. The magnetic field generators are not illustrated in these drawings.

In the reproduction operation as shown in FIG. 9A and FIG. 9B, the reproducing magnetic field Hr is applied to the magnetic recording medium 80b. The first magnetic field H1 may be utilized as the reproducing magnetic field Hr.

At this time, the strength of the reproducing magnetic field Hr is set appropriately. In other words, the magnetization of the magnetic film of the recording layer is not reversed by the application of the reproducing magnetic field Hr. For example, the reproducing magnetic field Hr is not more than the reversal magnetic field of the first magnetic film 81a. The reversal magnetic field is determined by the coupling magnetic field and the coercivity of the first magnetic film.

A first frequency fa1 is the magnetic resonance frequency of the first magnetic film 81a. A second frequency fa2 is the magnetic resonance frequency of the second magnetic film 81b. A third frequency fa3 is the magnetic resonance frequency of the third magnetic film 81c. A fourth frequency fa4 is the magnetic resonance frequency of the fourth magnetic film 81d.

For example, the magnetic anisotropy of the second magnetic film 81b is higher than the magnetic anisotropy of the first magnetic film 81a. For example, the magnetic anisotropy of the fourth magnetic film 81d is higher than the magnetic anisotropy of the third magnetic film 81c.

The second frequency fa2 of the second magnetic film 81b and the fourth frequency fa4 of the fourth magnetic film 81d each are, for example, greater than 20 GHz but less than 100 GHz. For example, the fourth frequency fa4 is different from the second frequency fa2.

The first frequency fa1 of the first magnetic film 81a and the third frequency fa3 of the third magnetic film 81c each are, for example, not less than 1 GHz and not more than 20 GHz. For example, the third frequency fa3 is different from the first frequency fa1.

For example, in the case where the information recorded in the first magnetic film 81a is reproduced in the first recorded state SI1, the reproducing magnetic field Hr is applied; and the first alternating magnetic field HR1 of substantially the same frequency as the first frequency fa1 is generated from the first stacked body SB1. Among the first to fourth magnetic films 81a to 81d, the magnetic resonance frequency of the first magnetic film 81a substantially matches the frequency of the first alternating magnetic field HR1. Magnetic resonance occurs selectively in the first magnetic film 81a. The energy that is generated from the first stacked body SB1 is absorbed by the first magnetic film 81a.

On the other hand, in the second recorded state SI2, the magnetic resonance frequency of the first magnetic film 81a changes to a frequency fb1. The magnetic resonance frequency of the second magnetic film 81b changes to a frequency fb2.

In such a case, magnetic resonance does not occur in the first magnetic film 81a even when the first alternating magnetic field HR1 of the first frequency fa1 is generated from the first stacked body SB1. Therefore, the energy is not absorbed. This is because the magnetic resonance frequency (the frequency fb1) of the first magnetic film 81a is different from the first frequency fa1 in the second recorded state SI2.

Thus, a difference of the absorption of the energy occurs between the first recorded state SI1 and the second recorded state SI2. For example, the effective damping in the first stacked body SB1 becomes large when the energy generated from the first stacked body SB1 is absorbed with the magnetic resonance of the magnetic film included in the magnetic recording medium 80b. Thereby, for example, the amplitude of the oscillation in the second magnetic layer 32 becomes small.

Due to the change of the amplitude, for example, the amplitude of the electrical signal based on the magnetoresistance effect changes. The orientation of the magnetization of the recording layer can be known by sensing the amplitude of the electrical signal.

Amplitude phase coupling is generated in the first stacked body SB1. For example, the frequency of the oscillation changes with the change of the amplitude. For example, the orientation of the magnetization of the recording layer can be known even by sensing the frequency.

Thus, the information recorded in the magnetic recording medium 80b can be reproduced. In the embodiment, the first magnetic field H1 is applied to the first stacked body SB1 by the first magnetic field generator 41. For example, the state in which the oscillation axis of the second magnetization M2 of the second magnetic layer 32 is aligned with the magnetic recording medium 80b can be maintained easily. Thereby, according to the embodiment, the effects of the stray magnetic field from the magnetic recording medium 80b on the first stacked body SB1 can be suppressed.

For example, the oscillation frequency of the first stacked body SB1 (e.g., the spin torque oscillator) easily can substantially match the resonance frequency of the recording layer. According to the embodiment, the change of the oscillation frequency due to the stray magnetic field from the magnetic recording medium 80b can be suppressed. Thereby, the reproduction is stabilized. Stable reproduction is possible; and high-density recording and reproducing are possible.

Examples of evaluation results of the characteristics of the magnetic recording and reproducing device will now be described. An example of results of a simulation will now be described.

Figures 10A, 10B:
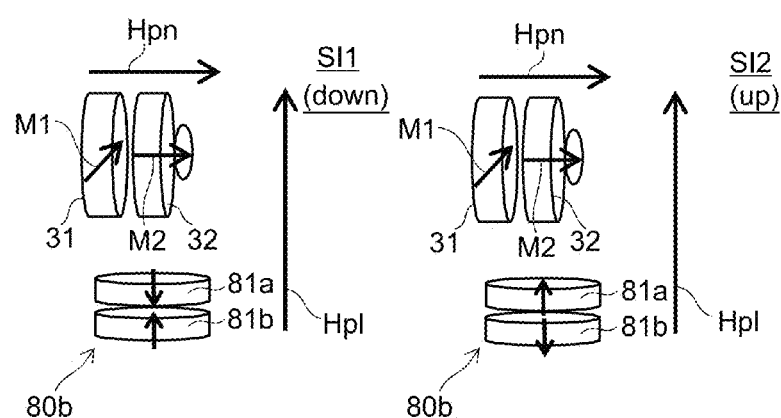
FIG. 10A and FIG. 10B are schematic views showing simulation models of the magnetic recording and reproducing device.

FIG. 10A and FIG. 10B are schematic views showing simulation models of the magnetic recording and reproducing device.

FIG. 10A corresponds to the first recorded state SI1. FIG. 10B corresponds to the second recorded state SI2. The first intermediate layer 31i and the first nonmagnetic film 81p are not illustrated in these drawings. A micromagnetic simulation is performed for the first stacked body SB1 and the magnetic recording medium 80b.

The model of the simulation is as follows. The first stacked body SB1 has a circular columnar configuration having a diameter of 30 nm. The thickness of the first magnetic layer 31 is 3 nm. The thickness of the first intermediate layer 31i is 1 nm. The thickness of the second magnetic layer 32 is 2 nm.

The second magnetic layer 32 is as follows. The Gilbert damping rate is 0.005. The exchange stiffness constant is $1.6\times10^{-6}$ erg/cm. The saturation magnetization is 1.2 kemu/cm$^3$. The perpendicular magnetic anisotropy constant is $7.5\times10^{-6}$ erg/cm$^3$. The spin polarization ratio is 0.65.

The first magnetization M1 of the first magnetic layer 31 is fixed. The saturation magnetization of the first magnetic layer 31 is 0.8 kemu/cm$^3$.

A magnetic field Hpl in the in-plane direction is applied to the first stacked body SB1. The magnetic field Hpl is perpendicular to the stacking direction (the second direction) of the first stacked body SB1. The magnetic field Hpl is aligned with the layer surface of the magnetic layer included in the first stacked body SB1. In the simulation, the magnitude of the magnetic field Hpl is 0.2 kOe. For example, the magnetic field Hpl corresponds to the first magnetic field H1.

A magnetic field Hpn in the surface normal direction is applied to the first stacked body SB1. The magnetic field Hpn is aligned with the stacking direction (the second direction) of the first stacked body SB1. In the simulation, the magnitude of the magnetic field Hpn changes in the range of 2.5 kOe to 3.5 kOe. For example, the magnetic field Hpn corresponds to the second magnetic field H2.

The distance between the first stacked body SB1 and the magnetic recording medium 80b is 10 nm. For example, the distance corresponds to the distance from the lower end of the first stacked body SB1 to the front surface of the recording layer.

The first magnetic film 81a, the second magnetic film 81b, and the first nonmagnetic film 81p are provided in the recording layer (e.g., the first recording layer 81A) of the magnetic recording medium 80b. The recording layer has a circular columnar configuration having a diameter of 30 nm.

The thickness of the first magnetic film 81a is 3 nm. The thickness of the first nonmagnetic film 81p is 1 nm. The thickness of the second magnetic film 81b is 3 nm.

The first magnetic film 81a is as follows. The Gilbert damping rate is 0.01. The exchange stiffness constant is $1.6 \times 10^{-6}$ erg/cm. The saturation magnetization is 0.8 kemu/cm$^3$. The perpendicular magnetic anisotropy constant is $3.8 \times 10^6$ erg/cm$^3$.

The strength of the antiferromagnetic coupling acting between the first magnetic film 81a and the second magnetic film 81b due to the first nonmagnetic film 81p is 0.6 erg/cm$^2$.

The second magnetic film 81b is as follows. The Gilbert damping rate is 0.02. The exchange stiffness constant is $1.6 \times 10^{-6}$ erg/cm. The saturation magnetization is 0.8 kemu/cm$^3$. The perpendicular magnetic anisotropy constant is $15.0 \times 10^6$ erg/cm$^3$.

The magnetic field Hpl recited above is applied to the magnetic recording medium 80b. The magnetic field Hpl is in the surface normal direction with respect to the recording layer (the first recording layer 81A). The magnetic field Hpl corresponds to the reproducing magnetic field Hr. In the magnetic recording medium 80b, the magnitude of the magnetic field Hpl is 0.2 kOe.

Figure 11A:
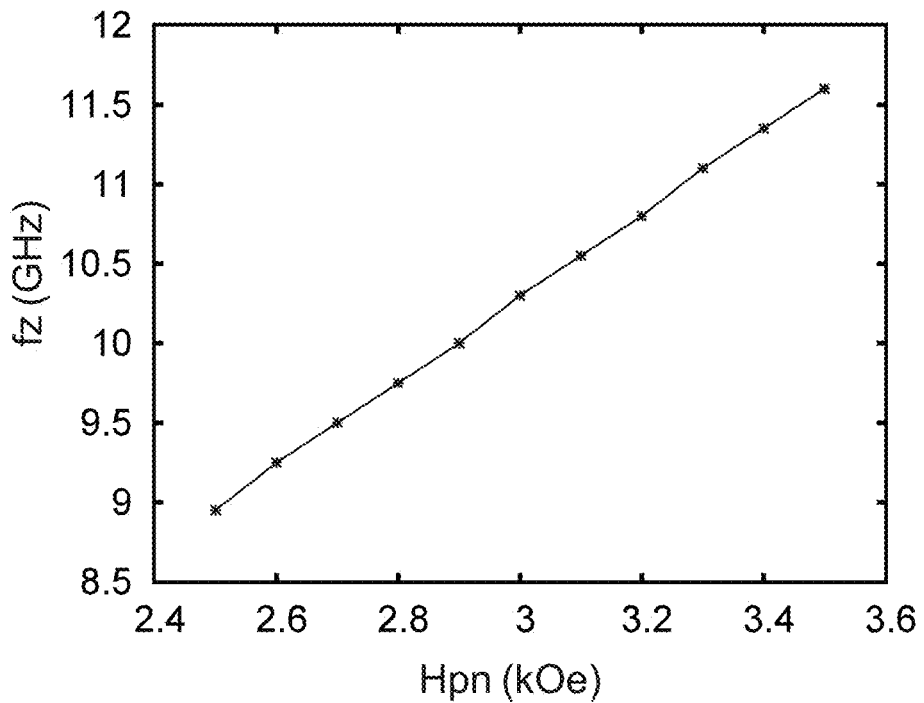
FIG. 11A and FIG. 11B are graphs illustrating the characteristics of the magnetic recording and reproducing device.
Figure 11B:
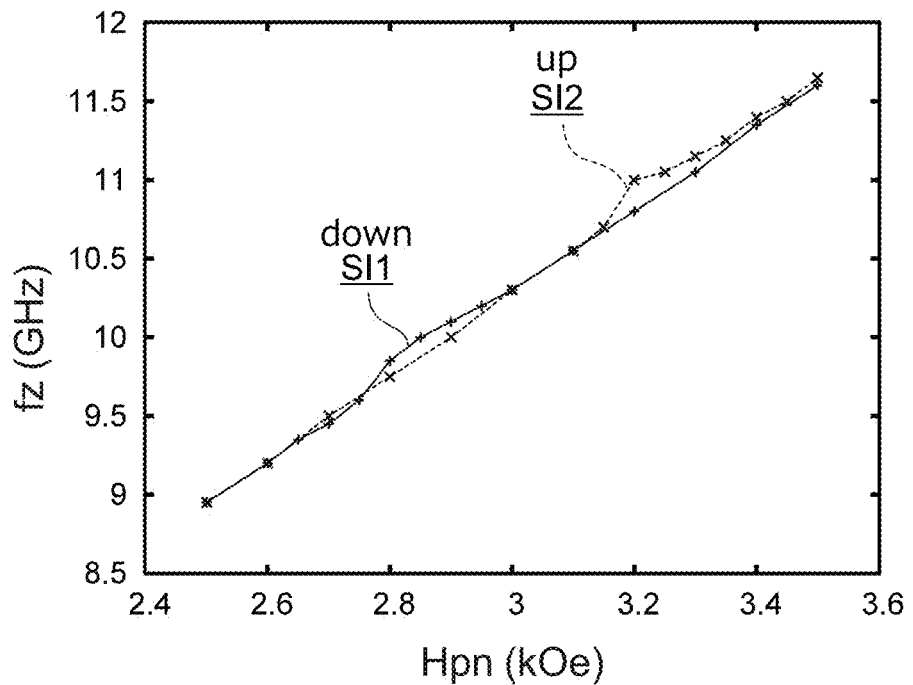

FIG. 11A and FIG. 11B are graphs illustrating the characteristics of the magnetic recording and reproducing device.

These figures show the simulation results. The horizontal axis is the magnetic field Hpn (the perpendicular magnetic field applied to the first stacked body SB1). The vertical axis is an oscillation frequency fz of the first stacked body SB1. FIG. 11A corresponds to the characteristic in the case where the magnetic recording medium 80b is not provided. FIG. 11B corresponds to the characteristics in the case where the magnetic recording medium 80b is provided. In FIG. 11B, the first recorded state SI1 (down) and the second recorded state SI2 (up) are shown.

As shown in FIG. 11A, in the case where the magnetic recording medium 80b is not provided, the oscillation frequency fz of the first alternating magnetic field HR1 generated from the first stacked body SB1 changes substantially linearly with respect to the magnetic field Hpn.

As shown in FIG. 11B, in the case where the magnetic recording medium 80b is provided, a peak (a shoulder) occurs in the oscillation frequency fz. The oscillation frequency fz shifts from the characteristic when the magnetic recording medium 80b is not provided (referring to FIG. 11A) at different magnetic fields Hpn for the first recorded state SI1 and the second recorded state SI2. This shows selective resonance according to the magnetization states of the magnetic films for the first stacked body SB1 and the magnetic films of the recording layer.

When the oscillation frequency fz is about 9.7 GHz, the oscillation frequency fz is different between the first recorded state SI1 and the second recorded state SI2. When the oscillation frequency fz is about 10.8 GHz, the oscillation frequency fz is different between the first recorded state SI1 and the second recorded state SI2. The oscillation frequency fz is substantially the same between the first recorded state SI1 and the second recorded state SI2 when the oscillation frequency fz is different from these two values.

For example, in the "down" recorded state, resonance occurs between the first stacked body SB1 and the recording layer at a frequency of about 9.7 GHz. For example, in the "up" recorded state, resonance occurs between the first stacked body SB1 and the recording layer at a frequency of about 10.8 GHz.

When such resonance occurs, a difference of the oscillation occurs between "down" and "up." This is because, in the embodiment, the oscillation axis of the second magnetic layer 32 is set to be substantially parallel to the recording layer; and the oscillations are set to be unresponsive to the stray magnetic field.

For example, when the magnetic recording medium 80b is not provided, the first stacked body SB1 that oscillates at about 9.7 GHz is used. In such a case, an oscillation state that is different from the oscillation state of about 9.7 GHz occurs for the recording layer in the "down" recorded state. In other words, the first stacked body SB1 responds to the recording layer in the "down" recorded state. Thereby, the orientation of the magnetization of the magnetic recording medium 80b can be reproduced.

Figure 12:
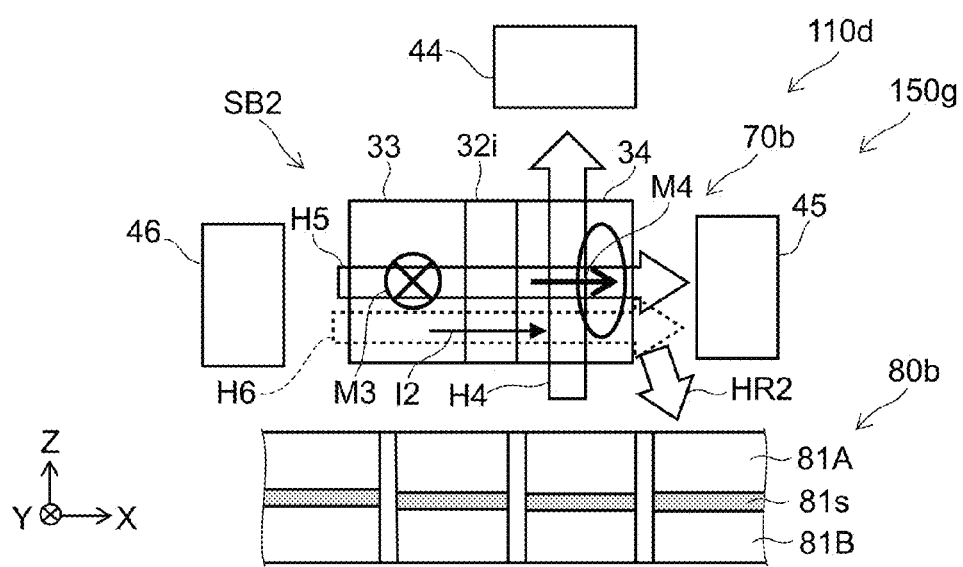
FIG. 12 is a schematic cross-sectional view illustrating another magnetic recording and reproducing device according to the first embodiment.

FIG. 12 is a schematic cross-sectional view illustrating another magnetic recording and reproducing device according to the first embodiment.

As shown in FIG. 12, the other magnetic memory device 150g according to the embodiment includes a magnetic head 110d and the magnetic recording medium 80b. The magnetic recording medium 80b may be the magnetic recording medium 80a described above.

The magnetic head 110d further includes a second reproducing unit 70b in addition to the first reproducing unit 70a described above (not illustrated in FIG. 12). The second reproducing unit 70b is arranged in the X-Y plane with the first reproducing unit 70a. For example, the second reproducing unit 70b is arranged with the first reproducing unit 70a in the Y-axis direction or the X-axis direction.

The second reproducing unit 70b includes a fourth magnetic field generator 44 and a second stacked body SB2. The fourth magnetic field generator 44 is separated from the magnetic recording medium 80b in the first direction (the Z-axis direction).

At least a portion of the second stacked body SB2 is provided between the magnetic recording medium 80b and the fourth magnetic field generator 44 in the first direction. The second stacked body SB2 includes a third magnetic layer 33, a fourth magnetic layer 34, and a second intermediate layer 32i. The fourth magnetic layer 34 is separated from the third magnetic layer 33 in a direction (that may be the second direction) crossing the first direction. The second intermediate layer 32i is provided between the third magnetic layer 33 and the fourth magnetic layer 34. The second intermediate layer 32i is, for example, nonmagnetic. The second stacked body SB2 is, for example, a spin torque oscillator. For example, a third magnetization M3 of the third magnetic layer 33 is substantially fixed. A fourth magnetization M4 of the fourth magnetic layer 34 rotates (oscillates).

The second stacked body SB2 performs an operation of generating a second alternating magnetic field HR2. The fourth magnetic field generator 44 applies a fourth magnetic field H4 to at least a portion of the second stacked body SB2. The second alternating magnetic field HR2 is, for example, a high frequency magnetic field. The frequency of the second alternating magnetic field HR2 is greater than 10 GHz and not more than 20 GHz.

For example, the frequency of the second alternating magnetic field HR2 generated from the second stacked body SB2 is different from the frequency of the first alternating magnetic field HR1 generated from the first stacked body SB1.

For example, the frequency of the first alternating magnetic field HR1 substantially matches the magnetic resonance frequency of the first recording layer 81A. The frequency of the second alternating magnetic field HR2 substantially matches the magnetic resonance frequency of the second recording layer 81B. The correspondence may be reversed.

For example, one of the multiple recording layers is reproduced using the first stacked body SB1. One other of the multiple recording layers is reproduced using the second stacked body SB2. Thereby, stable reproducing is possible. Higher-density magnetic recording is possible. The number of multiple stacked bodies may be three or more.

As shown in FIG. 12, the second reproducing unit 70b may further include a fifth magnetic field generator 45. The fourth magnetic layer 34 is disposed between the third magnetic layer 33 and the fifth magnetic field generator 45. A fifth magnetic field H5 that is generated by the fifth magnetic field generator 45 has a component along a direction connecting the third magnetic layer 33 and the fourth magnetic layer 34. The fifth magnetic field H5 has a component oriented from the third magnetic layer 33 toward the fourth magnetic layer 34. For example, the frequency of the second alternating magnetic field HR2 changes according to the fifth magnetic field H5.

The second reproducing unit 70b may further include a sixth magnetic field generator 46. The third magnetic layer 33 is disposed between the sixth magnetic field generator 46 and the fourth magnetic layer 34. A sixth magnetic field H6 that is generated by the sixth magnetic field generator 46 has a component along a direction connecting the third magnetic layer 33 and the fourth magnetic layer 34. The sixth magnetic field H6 has a component oriented from the third magnetic layer 33 toward the fourth magnetic layer 34.

Second Embodiment

The second embodiment relates to a magnetic head. The magnetic head according to the embodiment includes any of the magnetic heads 110 and 110a to 110d recited above or a modification of the magnetic heads.

As shown in FIG. 1, the magnetic head (e.g., the magnetic head 110a) according to the embodiment includes the first reproducing unit 70a. The first reproducing unit 70a includes the first magnetic field generator 41 and the first stacked body SB1. The first stacked body SB1 is arranged with the first magnetic field generator 41 in the first direction.

The first stacked body SB1 includes the first magnetic layer 31, the second magnetic layer 32, and the first intermediate layer 31i. The second magnetic layer 32 is separated from the first magnetic layer 31 in the second direction crossing the first direction. The first intermediate layer 31i is provided between the first magnetic layer 31 and the second magnetic layer 32.

The first stacked body SB1 performs an operation of generating the first alternating magnetic field HR1. The first magnetic field generator 41 applies the first magnetic field H1 to at least a portion of the first stacked body SB1.

For example, the first magnetic field H1 has a component along a direction connecting the magnetic recording medium 80a (or the magnetic recording medium 80b) and the first magnetic field generator 41. For example, the first magnetic field H1 has a component oriented from the magnetic recording medium 80a (or the magnetic recording medium 80b) toward the first magnetic field generator 41.

According to the magnetic head according to the embodiment, for example, the effects of the stray magnetic field on the first stacked body SB1 can be suppressed. Thereby, reproduction that utilizes resonance can be implemented stably. For example, even in the case where the recording density is increased, a stable reproduction operation is possible. According to the embodiment, a magnetic head can be provided in which the recording density can be increased.

Third Embodiment

A third embodiment relates to a magnetic recording medium. The magnetic recording medium according to the embodiment includes the magnetic recording medium 80b recited above or a modification of the magnetic recording medium 80b. The magnetic recording medium 80b according to the embodiment includes the first recording layer 81A and the second recording layer 81B (referring to FIG. 4 to FIG. 6). The second recording layer 81B overlaps the first recording layer 81A in the first direction.

The first magnetic resonance frequency of the first recording layer 81A is higher than the second magnetic resonance frequency of the second recording layer 81B. The first information that is recorded in the first recording layer 81A and the second information that is recorded in the second recording layer 81B are reproduced by the first reproducing unit 70a of the magnetic head.

The first reproducing unit 70a includes the first magnetic field generator 41 and the first stacked body SB1. The first stacked body SB1 is arranged with (overlaps) the first magnetic field generator 41 in the first direction. The first stacked body SB1 includes the first magnetic layer 31, the second magnetic layer 32, and the first intermediate layer 31i. The second magnetic layer 32 is separated from the first magnetic layer 31 in the second direction crossing the first direction. The first intermediate layer 31i is provided between the first magnetic layer 31 and the second magnetic layer 32. The first stacked body SB1 performs an operation of generating the first alternating magnetic field HR1.

The first magnetic field generator 41 applies the first magnetic field H1 to at least a portion of the first stacked body SB1. The first frequency of the first alternating magnetic field HR1 in the first operation of reproducing the first information is higher than the second frequency of the first alternating magnetic field HR1 in the second operation of reproducing the second information.

In the magnetic recording medium 80b according to the embodiment, the effects of the stray magnetic field on the first stacked body SB1 can be suppressed. Reproduction that utilizes resonance is implemented stably. For example, a stable reproduction operation is possible even in the case where the recording density is increased. According to the embodiment, a magnetic recording medium can be provided in which the recording density can be increased.

For example, three-dimensional magnetic recording that includes multiple recording layers is used as technology for increasing the recording density of the magnetic recording. In three-dimensional magnetic recording, for example, magnetic resonance is utilized when selecting the recording layer for which the writing or reproducing is performed. Other than three-dimensional magnetic recording, there are also cases where reproduction that utilizes magnetic resonance is performed even when recording one layer. For example, a reproducing magnetic field is applied to a narrow region on the recording layer; the resonance frequency of the recording layer of the region is selectively modulated; and the reproduction is performed using a high frequency magnetic field having a corresponding frequency. Thereby, the spatial resolution of the reproduction can be increased.

According to the embodiment, the effects of the stray magnetic field from the magnetic recording medium can be suppressed. For example, even in the case where the recording density is increased, a stable reproduction operation is possible. According to the embodiment, a magnetic recording medium can be provided in which the recording density can be increased.

Figure 13:
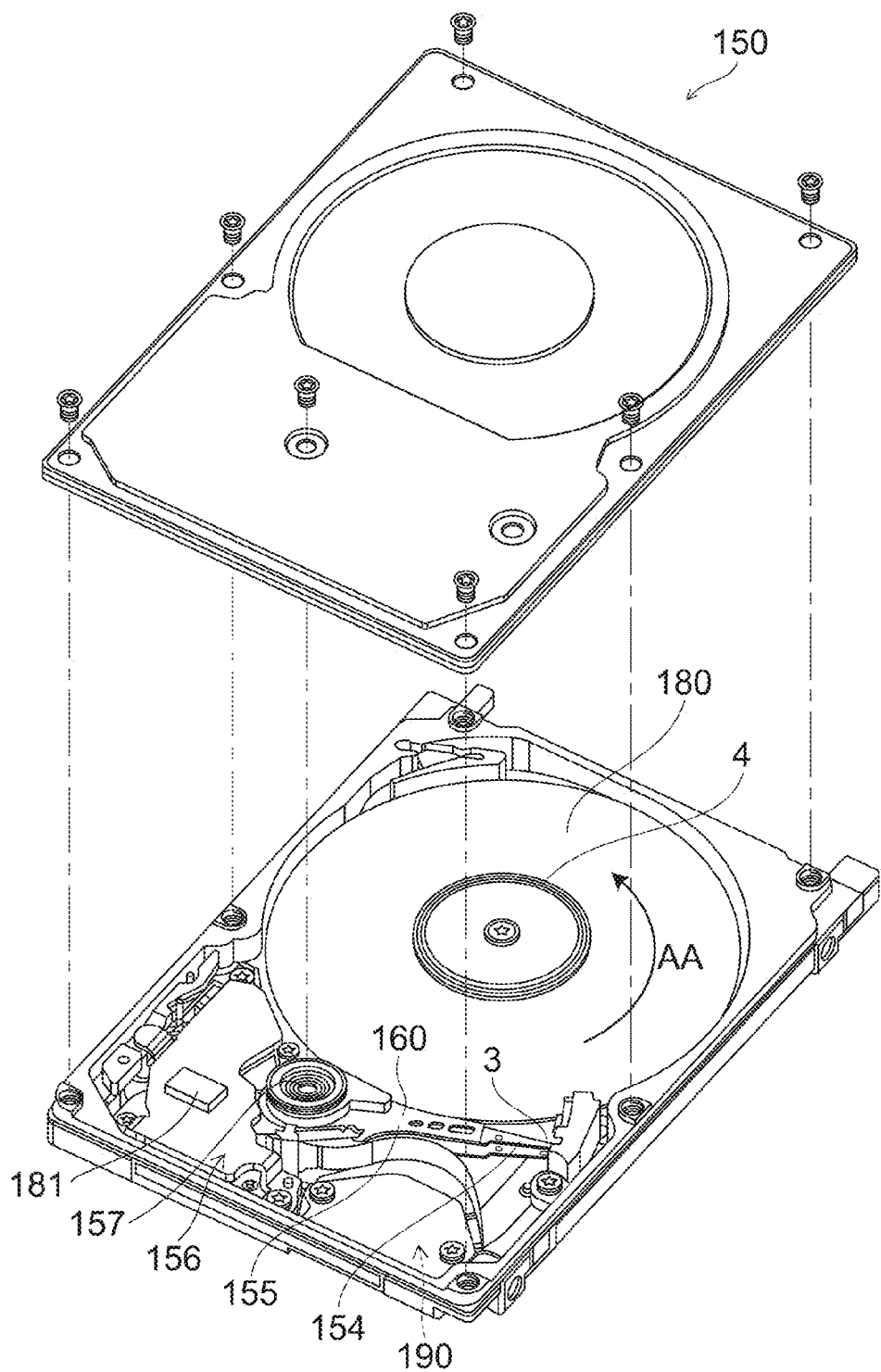
FIG. 13 is a schematic perspective view illustrating the magnetic recording and reproducing device according to the embodiment.

FIG. 13 is a schematic perspective view illustrating the magnetic recording and reproducing device according to the embodiment.

Figure 14A:
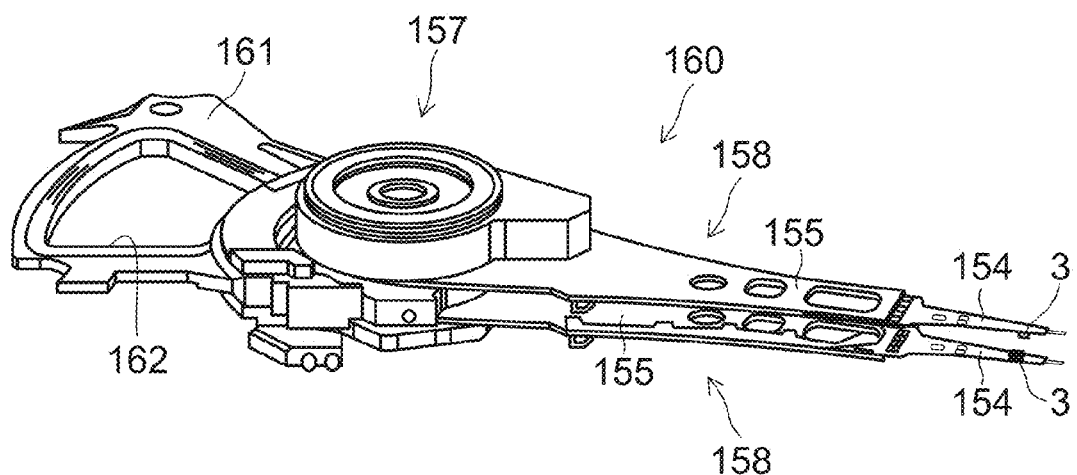
FIG. 14A and FIG. 14B are schematic perspective views illustrating a portion of the magnetic recording and reproducing device.
Figure 14B:
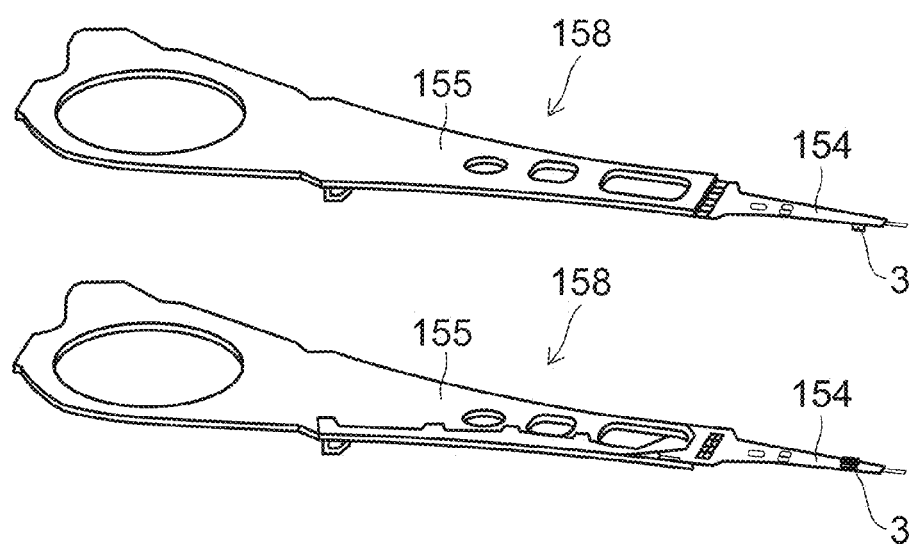

FIG. 14A and FIG. 14B are schematic perspective views illustrating a portion of the magnetic recording and reproducing device.

As shown in FIG. 13, the magnetic recording and reproducing device 150 according to the embodiment is a device that uses a rotary actuator. A recording medium disk 180 is mounted to a spindle motor 4 and is rotated in the direction of arrow AA by a motor that responds to a control signal from a drive device controller. The magnetic recording and reproducing device 150 according to the embodiment may include multiple recording medium disks 180. The magnetic recording and reproducing device 150 may include a recording medium 181. For example, the magnetic recording and reproducing device 150 is a hybrid HDD (Hard Disk Drive). The recording medium 181 is, for example, a SSD (Solid State Drive). The recording medium 181 includes, for example, nonvolatile memory such as flash memory, etc.

A head slider 3 that performs the recording and reproducing of the information stored in the recording medium disk 180 is mounted to the tip of a suspension 154 having a thin-film configuration. Here, for example, one of the magnetic heads according to the embodiments described above is mounted at the tip vicinity of the head slider 3.

When the recording medium disk 180 rotates, the medium-opposing surface (the ABS) of the head slider 3 is held at a prescribed fly height from the surface of the recording medium disk 180 by the balance between the downward pressure due to the suspension 154 and the pressure generated by the medium-opposing surface of the head slider 3. A so-called "contact-sliding" head slider 3 that contacts the recording medium disk 180 may be used.

The suspension 154 is connected to one end of an arm 155 (e.g., an actuator arm). The arm 155 includes, for example, a bobbin unit holding the drive coil, etc. A voice coil motor 156 which is one type of linear motor is provided at another end of the arm 155. The voice coil motor 156 may include a drive coil that is wound onto the bobbin unit of the arm 155, and a magnetic circuit made of a permanent magnet and an opposing yoke that are disposed to oppose each other with the coil interposed. The suspension 154 has one end and another end; the magnetic head is mounted to the one end of the suspension 154; and the arm 155 is connected to the other end of the suspension 154.

The arm 155 is held by ball bearings provided at two locations above and below a bearing unit 157; and the arm 155 can be caused to rotate and slide unrestrictedly by the voice coil motor 156. As a result, the magnetic head is movable to any position of the recording medium disk 180.

FIG. 14A illustrates the configuration of a portion of the magnetic recording and reproducing device and is an enlarged perspective view of a head stack assembly 160.

FIG. 14B is a perspective view illustrating a magnetic head assembly (a head gimbal assembly (HGA)) 158 which is a portion of the head stack assembly 160.

As shown in FIG. 14A, the head stack assembly 160 includes the bearing unit 157, the head gimbal assembly 158, and a support frame 161. The head gimbal assembly 158 extends from the bearing unit 157. The support frame 161 extends from the bearing unit 157 in the reverse direction of the HGA. The support frame 161 supports a coil 162 of the voice coil motor.

As shown in FIG. 14B, the head gimbal assembly 158 includes the arm 155 that extends from the bearing unit 157, and the suspension 154 that extends from the arm 155.

The head slider 3 is mounted to the tip of the suspension 154. One of the magnetic heads according to the embodiments is mounted to the head slider 3.

In other words, the magnetic head assembly (the head gimbal assembly) 158 according to the embodiment includes the magnetic head according to the embodiment, the head slider 3 to which the magnetic head is mounted, the suspension 154 that has the head slider 3 mounted to one end of the suspension 154, and the arm 155 that is connected to the other end of the suspension 154.

The suspension 154 includes lead wires (not illustrated) that are for writing and reproducing signals, for a heater that adjusts the fly height, for example, for a spin torque oscillator, etc. The lead wires are electrically connected to electrodes of the magnetic head embedded in the head slider 3.

A signal processor 190 that performs writing and reproducing of the signals to and from the magnetic recording medium by using the magnetic head also is provided. For example, the signal processor 190 is provided on the backside inside the drawing of the magnetic recording and reproducing device 150 illustrated in FIG. 13. The input/output lines of the signal processor 190 are electrically coupled to the magnetic head by being connected to electrode pads of the head gimbal assembly 158.

Thus, the magnetic recording and reproducing device 150 according to the embodiment includes a magnetic recording medium, the magnetic head according to the embodiment recited above, a movable unit that is relatively movable in a state in which the magnetic recording medium and the magnetic head are separated from each other or in contact with each other, a position controller that aligns the magnetic head at a prescribed recording position of the magnetic recording medium, and a signal processor that writes and reproduces signals to and from the magnetic recording medium by using the magnetic head.

In other words, the recording medium disk 180 is used as the magnetic recording medium recited above.

The movable unit recited above may include the head slider 3.

The position controller recited above may include the head gimbal assembly 158.

Thus, the magnetic recording and reproducing device 150 according to the embodiment includes the magnetic recording medium, the magnetic head assembly according to the embodiment, and the signal processor that writes and reproduces the signals to and from the magnetic recording medium by using the magnetic head mounted to the magnetic head assembly.

The embodiment may include, for example, the following configurations.

(Configuration 1)

A magnetic recording and reproducing device, comprising:
 a magnetic recording medium; and
 a magnetic head including a first reproducing unit,
 the first reproducing unit including
  a first magnetic field generator separated from the magnetic recording medium in a first direction, and
  a first stacked body, at least a portion of the first stacked body being provided between the magnetic recording medium and the first magnetic field generator in the first direction, the first stacked body including
a first magnetic layer,
a second magnetic layer separated from the first magnetic layer in a second direction crossing the first direction, and
a first intermediate layer provided between the first magnetic layer and the second magnetic layer,
the first stacked body performing an operation of generating a first alternating magnetic field,
the first magnetic field generator applying a first magnetic field to at least a portion of the first stacked body.

(Configuration 2)

The device according to configuration 1, wherein
the first magnetic field is applied to the at least a portion of the first stacked body, and
the first magnetic field has a component along a direction connecting the magnetic recording medium and the first magnetic field generator.

(Configuration 3)

The device according to configuration 1 or 2, wherein a frequency of the first alternating magnetic field changes according to a current flowing between the first magnetic layer and the second magnetic layer.

(Configuration 4)

The device according to one of configurations 1 to 3, wherein a first magnetization of the first magnetic layer crosses the first direction and crosses the second direction.

(Configuration 5)

The device according to one of configurations 1 to 4, wherein a second magnetization of the second magnetic layer is aligned with the second direction when a current does not flow in the first stacked body.

(Configuration 6)

The device according to configuration 5, wherein the second magnetization has a component along a direction connecting the first magnetic layer and the second magnetic layer.

(Configuration 7)

The device according to one of configurations 1 to 6, wherein
the first reproducing unit further includes a second magnetic field generator, and
the second magnetic layer is disposed between the first magnetic layer and the second magnetic field generator.

(Configuration 8)

The device according to configuration 7, wherein a second magnetic field generated by the second magnetic field generator has a component along a direction connecting the first magnetic layer and the second magnetic layer.

(Configuration 9)

The device according to configuration 7 or 8, wherein a frequency of the first alternating magnetic field changes according to the second magnetic field.

(Configuration 10)

The device according to one of configurations 1 to 9, wherein
the first reproducing unit further includes a third magnetic field generator, and
the first magnetic layer is disposed between the third magnetic field generator and the second magnetic layer.

(Configuration 11)

The device according to configuration 10, wherein a third magnetic field generated by the third magnetic field generator has a component along a direction connecting the first magnetic layer and the second magnetic layer.

(Configuration 12)

The device according to one of configurations 1 to 11, wherein
the magnetic recording medium includes a first recording layer,
the first recording layer includes:
a first magnetic film; and
a second magnetic film overlapping the first magnetic film in the first direction, and
an orientation of a magnetization of the second magnetic film has a component opposite to an orientation of a magnetization of the first magnetic film.

(Configuration 13)

The device according to one of configurations 1 to 11, wherein
the magnetic recording medium includes:
a first recording layer; and
a second recording layer overlapping the first recording layer in the first direction, and
a first magnetic resonance frequency of the first recording layer is higher than a second magnetic resonance frequency of the second recording layer.

(Configuration 14)

The device according to configuration 13, wherein at least a portion of the first recording layer is positioned between the second recording layer and the first stacked body.

(Configuration 15)

The device according to configuration 13 or 14, wherein
the first reproducing unit implements a first operation and a second operation, the first operation reproducing information recorded in the first recording layer, the second operation reproducing information recorded in the second recording layer, and
a first frequency of the first alternating magnetic field in the first operation is higher than a second frequency of the first alternating magnetic field in the second operation.

(Configuration 16)

The device according to one of configurations 1 to 15, wherein
the magnetic head further includes a second reproducing unit,
the second reproducing unit includes:
a fourth magnetic field generator separated from the magnetic recording medium in the first direction; and
a second stacked body,
at least a portion of the second stacked body is provided between the magnetic recording medium and the fourth magnetic field generator in the first direction,
the second stacked body includes:
a third magnetic layer;
a fourth magnetic layer separated from the third magnetic layer in a direction crossing the first direction; and
a second intermediate layer provided between the third magnetic layer and the fourth magnetic layer,
the second stacked body performs an operation of generating a second alternating magnetic field, and
the fourth magnetic field generator generates a fourth magnetic field.

(Configuration 17)

A magnetic head, comprising:
a first reproducing unit including
a first magnetic field generator, and
a first stacked body arranged with the first magnetic field generator in a first direction,
the first stacked body including a first magnetic layer,
a second magnetic layer separated from the first magnetic layer in a second direction crossing the first direction, and
a first intermediate layer provided between the first magnetic layer and the second magnetic layer,
the first stacked body performing an operation of generating a first alternating magnetic field,
the first magnetic field generator generating a first magnetic field.
(Configuration 18)
The magnetic head according to configuration 17, wherein
the first magnetic field is applied to at least a portion of the first stacked body, and
the first magnetic field has a component along a direction connecting the magnetic recording medium and the first magnetic field generator.
(Configuration 19)
The magnetic head according to configuration 17 or 18 17, wherein a frequency of the first alternating magnetic field changes according to the first magnetic field.
(Configuration 20)
A magnetic recording medium, comprising:
a first recording layer; and
a second recording layer overlapping the first recording layer in a first direction,
a first magnetic resonance frequency of the first recording layer being higher than a second magnetic resonance frequency of the second recording layer,
first information recorded in the first recording layer and second information recorded in the second recording layer being reproduced by a first reproducing unit of a magnetic head,
the first reproducing unit including
a first magnetic field generator, and
a first stacked body arranged with the first magnetic field generator in the first direction,
the first stacked body including
a first magnetic layer,
a second magnetic layer separated from the first magnetic layer in a second direction crossing the first direction, and
a first intermediate layer provided between the first magnetic layer and the second magnetic layer,
the first stacked body performing an operation of generating a first alternating magnetic field,
the first magnetic field generator generating a first magnetic field,
a first frequency of the first alternating magnetic field in a first operation of reproducing the first information being higher than a second frequency of the first alternating magnetic field in a second operation of reproducing the second information.

According to the embodiments, a magnetic recording and reproducing device, a magnetic head, and a magnetic recording medium can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording and reproducing devices such as magnetic recording medium, recording layers, magnetic films, etc., and included in magnetic heads such as magnetic field generators, reproducing units, stacked bodies, magnetic layers, intermediate layers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording and reproducing devices, magnetic heads, and magnetic recording mediums practicable by an appropriate design modification by one skilled in the art based on the magnetic recording and reproducing devices, the magnetic heads, and the magnetic recording mediums described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A magnetic recording and reproducing device, comprising:
a magnetic recording medium; and
a magnetic head including a first reproducing unit,
the first reproducing unit including
a first magnetic field generator separated from the magnetic recording medium in a first direction, and
a first stacked body,
at least a portion of the first stacked body being provided between the magnetic recording medium and the first magnetic field generator in the first direction,
the first stacked body including
a first magnetic layer,
a second magnetic layer separated from the first magnetic layer in a second direction crossing the first direction, and
a first intermediate layer provided between the first magnetic layer and the second magnetic layer,
the first stacked body being configured to perform an operation of generating a first alternating magnetic field,
the first magnetic field generator being configured to apply a first magnetic field to at least a portion of the first stacked body.
2. The device according to claim 1, wherein
the first magnetic field is applied to the at least a portion of the first stacked body, and the first magnetic field has a component along a direction connecting the magnetic recording medium and the first magnetic field generator.

3. The device according to claim 1, wherein a frequency of the first alternating magnetic field changes according to a current flowing between the first magnetic layer and the second magnetic layer.

4. The device according to claim 1, wherein a first magnetization of the first magnetic layer crosses the first direction and crosses the second direction.

5. The device according to claim 1, wherein a second magnetization of the second magnetic layer is aligned with the second direction when a current does not flow in the first stacked body.

6. The device according to claim 5, wherein the second magnetization has a component along a direction from one of the first magnetic layer and the second magnetic layer toward other one of the first magnetic layer and the second magnetic layer.

7. The device according to claim 1, wherein
the first reproducing unit further includes a second magnetic field generator, and
the second magnetic layer is provided between the first magnetic layer and the second magnetic field generator.

8. The device according to claim 7, wherein a second magnetic field generated by the second magnetic field generator has a component along a direction from on of the first magnetic layer and the second magnetic layer toward other one of the first magnetic layer and the second magnetic layer.

9. The device according to claim 7, wherein a frequency of the first alternating magnetic field changes according to the second magnetic field.

10. The device according to claim 1, wherein
the first reproducing unit further includes a third magnetic field generator, and
the first magnetic layer is disposed between the third magnetic field generator and the second magnetic layer.

11. The device according to claim 10, wherein a third magnetic field generated by the third magnetic field generator has a component along a direction from one of the first magnetic layer and the second magnetic layer toward other one of the first magnetic layer and the second magnetic layer.

12. The device according to claim 1, wherein
the magnetic recording medium includes a first recording layer,
the first recording layer includes:
a first magnetic film; and
a second magnetic film overlapping the first magnetic film in the first direction, and
an orientation of a magnetization of the second magnetic film has a component opposite to an orientation of a magnetization of the first magnetic film.

13. The device according to claim 1, wherein
the magnetic recording medium includes:
a first recording layer; and
a second recording layer overlapping the first recording layer in the first direction, and
a first magnetic resonance frequency of the first recording layer is higher than a second magnetic resonance frequency of the second recording layer.

14. The device according to claim 13, wherein at least a portion of the first recording layer is positioned between the second recording layer and the first stacked body.

15. The device according to claim 13, wherein
the first reproducing unit implements a first operation and a second operation, the first operation reproducing information recorded in the first recording layer, the second operation reproducing information recorded in the second recording layer, and
a first frequency of the first alternating magnetic field in the first operation is higher than a second frequency of the first alternating magnetic field in the second operation.

16. The device according to claim 1, wherein
the magnetic head further includes a second reproducing unit,
the second reproducing unit includes:
a fourth magnetic field generator separated from the magnetic recording medium in the first direction; and
a second stacked body,
at least a portion of the second stacked body is provided between the magnetic recording medium and the fourth magnetic field generator in the first direction,
the second stacked body includes:
a third magnetic layer;
a fourth magnetic layer separated from the third magnetic layer in a direction crossing the first direction; and
a second intermediate layer provided between the third magnetic layer and the fourth magnetic layer,
the second stacked body performs an operation of generating a second alternating magnetic field; and
the fourth magnetic field generator generates a fourth magnetic field.

17. A magnetic head, comprising:
a first reproducing unit including
a first magnetic field generator, and
a first stacked body arranged with the first magnetic field generator in a first direction,
the first stacked body including
a first magnetic layer,
a second magnetic layer separated from the first magnetic layer in a second direction crossing the first direction, and
a first intermediate layer provided between the first magnetic layer and the second magnetic layer,
the first stacked body being configured to perform an operation of generating a first alternating magnetic field,
the first magnetic field generator being configured to generate a first magnetic field.

18. The magnetic head according to claim 17, wherein
the first magnetic field is applied to at least a portion of the first stacked body, and
the first magnetic field has a component along a direction connecting the magnetic recording medium and the first magnetic field generator.

19. The magnetic head according to claim 17, wherein a frequency of the first alternating magnetic field changes according to the first magnetic field.

* * * * *